_United States Patent_ [19]

Seed

[11] Patent Number: 4,952,939

[45] Date of Patent: Aug. 28, 1990

[54] RADAR INTRUSION DETECTION SYSTEM

[76] Inventor: Willian R. Seed, 115 Priam Way, Nepean, Ontario, Canada, K2H 8S7

[21] Appl. No.: 311,271

[22] Filed: Feb. 16, 1989

[51] Int. Cl.$^5$ ............................................... G01S 9/42
[52] U.S. Cl. ........................................ 342/27; 340/552
[58] Field of Search .................... 342/27, 28, 118, 127, 342/145; 340/552

[56] References Cited

U.S. PATENT DOCUMENTS

| | | |
|---|---|---|
| 3,794,992 | 2/1974 | Gehman ................................. 342/28 |
| 4,051,472 | 9/1977 | Albanese et al. ....................... 342/28 |
| 4,187,501 | 2/1980 | Olesch et al. . |
| 4,419,659 | 12/1983 | Harman et al. ........................ 342/28 |
| 4,458,240 | 7/1984 | Rittenbach et al. . |
| 4,595,924 | 6/1986 | Gehman . |
| 4,605,922 | 8/1986 | Blattman et al. . |

_Primary Examiner_—Thomas H. Tarcza
_Assistant Examiner_—Mark Hellner
_Attorney, Agent, or Firm_—Jones, Tullar & Cooper

[57] ABSTRACT

A bistatic Doppler radar intrusion detection system which utilizes a high duty-cycle phase-coded pulse compression signal to provide a range-gated detection zone is described. The combined transmit and receive antenna beam patterns define the shape of the detection zone in azimuth and elevation. The distance from the antennas to the detection zone and depth of the detection zone are determined by the pulse compression code sequence selections. The system consists of a transmitter having a code sequence generator for generating one of a selected number of codes and a code sequence. An antenna transmits the modulated signal through the detection zone. A programmable digital delay circuit is used to provide a delayed replica of the code sequence and thereby specify the detection zone range. A receiver is provided having an antenna for receiving signals scattered from the detection zone. The received signal is split into two paths, in-phase and quadrature-phase and reference signals from the delayed replica used to synchronously detect the received signal. Processing circuitry computes the Doppler frequency spectra of the received signal and performs automatic detection of targets traversing the detection zone.

5 Claims, 3 Drawing Sheets

RADAR INTRUSION DETECTION SYSTEM

BACKGROUND OF THE INVENTION

1. Field of the Invention

The present invention relates to intrusion detection systems and, specifically to a system using bistatic radar and Doppler radar processing techniques in conjunction with phase-coded pulse compression methods to achieve a high resolution detection zone "window".

The term "pulse compression" is used in the sense given in the I.E.E.E. Standard Dictionary, namely: "The coding and processing of a signal pulse of long time duration to one of short time duration and high range resolution, while maintaining the benefits of high pulse energy."

2. Description of Related Art

Intrusion detection systems can be of a line sensor type or volumetric sensor type. Line sensors provide perimeter security. In such systems, targets passing between the antennas cause partial or complete blockage of the transmit signal, resulting in the declaration of an alarm. Such systems cannot, however, provide true Doppler detection since there is no net radial movement. Leaky cables have also been used to provide perimeter coverage but are difficult to deploy rapidly. The operation of a leaky cable sensor above ground is troubled by moving foliage, sunlight, temperature drift and moisture around and on the cables. The result can be a high false alarm rate and an unsatisfactory detection performance.

The present invention relates to a volumetric sensor. There is a requirement for such a volumetric security sensor to detect intruders and vehicles. For example, weapons stockpiles, mobile $C^3I$ resources and garrisons must be alerted to an intrusion well before the intruder can wreak havoc on the resource. The requirement typically is for a detection zone which is at least a few tens of meters away from the resource to allow unrestricted movement about the resource itself. It may be impractical to position the intrusion detection system in or near the detection zone. Consequently, there is a requirement for a security sensor that can provide a detection zone far enough away from the resource and the sensor itself to allow security forces to react. A well-defined zone centered 20–200 m away from the resource is sufficient for a number of security applications. The security sensor should be able to detect and track intrusions to allow security forces to quickly locate and intercept the potential intruder.

Any intrusion detection radar system should have a well defined detection zone. Movement outside the detection zone should not result in an alarm. Personnel movement in the vicinity of the antennas, such as within an encampment, must be tolerated by the system. Since the detection zone is usually some distance from the antennas, radar range-gating techniques are necessary.

The sensor must provide detection of a variety of ground level intrusions, such as vehicles and both a crawling and on-foot intruder. Airborne intrusion (e.g., hang glider, parachute) must also be detected by the radar system. The detection process for such targets can be optimized by using coherent or synchronous detection techniques, thus enabling Doppler signal processing. This allows both magnitude and phase information of the returned signal to be used in processing the data.

Foliage penetration capabilities are required for a number of security applications. The sensor must also be able to discriminate between the signal returned from blowing foliage and a legitimate target. Signal processing techniques, for example Fourier analysis and Kalmus filtering, are commonly used to help "unmask" an intruder's scattered signal from the clutter return signal. The sensor must be able to maintain a high detection capability/low false alarm rate over all weather conditions.

There are a variety of techniques that can be used to determine the range of the received signal. The traditional means to achieve this has been pulse-type radar; that is, a pulse or burst of RF energy is transmitted, with the received signal sampled once or a number of times. Each successive sample corresponds to a more distant range cell. The depth of the detection zone is approximately equal to the length of the pulse multiplied by the speed of light. For example, a 200 nsec pulse can yield a range resolution of 60 m or better. As a result, fine resolution in range requires a short pulse and therefore a higher peak power. In an effort to reduce the peak power requirement while still maintaining the same range resolution, radar designers utilize pulse compression signals. The more common pulse compression signals used are the frequency chirp and phase-coded waveforms. A chirp waveform is accomplished by a gradual (or step-wise) increase or decrease in the rate of change of phase of the transmitted signal. Phase-coded signals are obtained by changing the phase, at instants determined by a code sequence, in a smooth or abrupt fashion of an otherwise continuous wave signal. There are a variety of code sequences that may be suitable for radar pulse compression. Pseudonoise (PN) sequences, Barker codes and complementary series are examples of code sequences that have favorable characteristics in terms of radar detection. The means to compress the returned pulse compression signal so as to achieve the same integrated response as a single pulse having the same total duration as the pulse compression signal (without sacrificing range resolution) may also take a variety of forms. Some of the more common techniques and technologies include digital correlation, active correlation, SAW devices, CCD correlators, and acousto-optic devices.

A line sensor using pseudo-random codes is disclosed in U.S. Pat. No. 4,605,922. This patent teaches a microwave motion sensor system using spaced transmitting and receiving antennas. The transmitted signal is modulated by a pseudorandom code to cause a spreading of the transmitted signal over a wide frequency band. This renders any jamming techniques ineffective. The receiver has a similar pseudo random code generator to that in the transmitter and locks on to the transmitted code. The random code sequence is not used for range gating as is done in the invention of this application.

U.S. Pat. No. 4,458,240, issued July 3, 1984 (issued on a divisional application of U.S. Pat. No. 4,187,501) shows a system using transmission line sensors in which the starting phase of the transmitted signal is switched by 0° or 180° from pulse to pulse under the control of a pseudo-random code generator. As in U.S. Pat. No. 4,605,912, this spreads the spectral energy and greatly reduces the effect of any interfering signal. The random code sequence is not used for range gating as it is in the invention of the present application.

A Continuous wave (CW) or multi-CW radar, though capable of providing a simple receiver design because of a high transmit signal duty-cycle at or near unity, cannot satisfy many of the above requirements. The lower bound on the sampling rate for a CW radar, given by the Nyquist sampling theorem, can be as low as a few tens of Hertz for the targets of interest. Movement around the antennas can overwhelm the return signal from targets just a few tens of meters away since there is no range-gating capability with such a signal. Similarly, large targets which are past the desired detection area cannot be suppressed; consequently, railways and roadways near the desired detection range can result in an unacceptably high nuisance alarm rate. Because of the inability to provide range-gating with CW signals, the nonfluctuating portion of the received signal, also referred to as the profile or stationary clutter, is usually quite large, often placing limits on the receiver sensitivity. U.S. Pat. No. 4,595,924 describes a Very High Frequency (VHF) CW Doppler radar.

A more conventional pulse-type radar, while capable of providing one or more "range cells", has numerous drawbacks. These include a much faster, more complex and therefor more costly data collection process, susceptibility to intentional or unintentional interference, ease of targeting by hostile forces, and an increased peak transmit power because of the transmit signal's low duty-cycle (typically well under 10%). As well, sampling in excess of 10 MHz is required for a detection zone resolution of 30 m or less. U.S. Pat. No. 3,603,996 describes such a pulsed Doppler radar.

SUMMARY OF THE INVENTION

The present invention pertains to a personnel intrusion detection radar that achieves a range-gated detection zone with a high duty-cycle phase-coded pulse compression signal. The range to the detection zone and its depth or width are programmable. By using a high duty-cycle pulse compression signal the more favorable attributes of CW and pulse-type radar systems are combined. The result is a radar system with the range resolution of a pulse-type radar and the sampling/preprocessing simplicity of a CW radar. Though designed primarily as an intrusion detection system, the sensor may also be used for object detection (e.g., railcars).

This result is achieved in accordance with the invention by using a pulse compressed signal containing a pseudo-random code to establish both the range and range window for targets of interest.

Specifically the invention relates to an intrusion detection system comprising: means transmitting a signal formed by phase changes of an RF signal at selected instants; means providing a code sequence to control the selected instants; means receiving a portion of the transmitted signal which may have been modified by the presence of a target; means reversing the phase changes of that portion of the received signal that corresponds to a detection zone; whereby only those portions of the received signal which have been reflected from objects at the selected range have a significant response following the phase change reversal.

DESCRIPTION OF THE PREFERRED EMBODIMENTS

Figure 1:
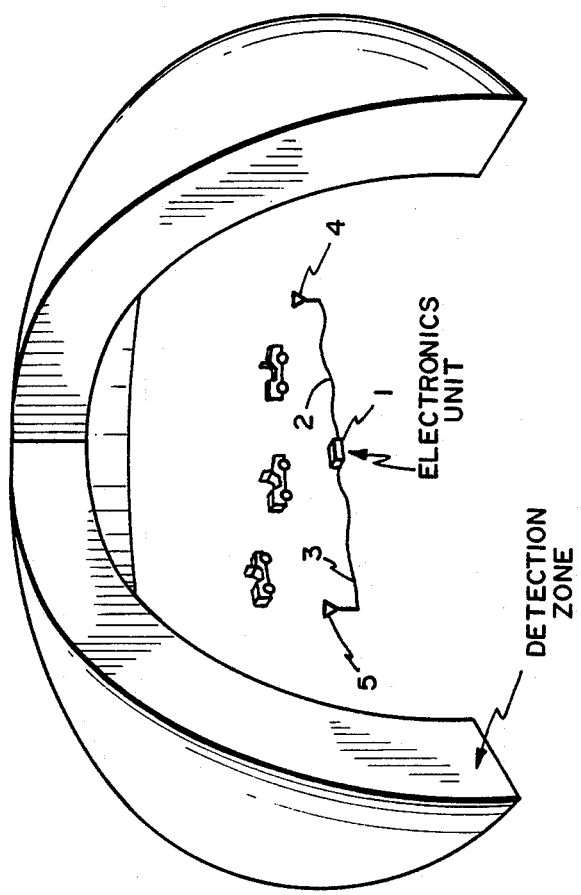
FIG. 1 is a schematic diagram showing the apparatus and detection zone of the system of the invention.

The intrusion detection system providing a threedimensional range-gated detection cell is shown in FIG. 1. The combined antenna beam patterns of the transmit and receive antennas shape the detection zone in azimuth and elevation. The detection zone may exist over a complete hemisphere, as illustrated in FIG. 1, or a portion thereof. The depth and range of the detection zone are programmable. An intruder approaching the antennas is illuminated with a phase-coded VHF signal. A portion of the scattered signal is received at the receive antenna. When the intruder enters the detection zone his return signal causes a deviation from the nominal or quiescent received signal spectrum. The radial movement of an intruder in the detection zone changes the phase and magnitude of the returned signal, due to the Doppler effect. A substantial change in the signal spectrum results in the declaration of an alarm. The signal received at the receive antenna from objects not in the detection zone is negligible following synchronous detection because of the autocorrelation properties of the code sequence, thereby providing a range-gated detection capability. Consequently, the system achieves a range resolution equal to that of a pulse-type radar, but because the system transmits and receives a high duty-cycle signal, requires only the sampling and preprocessing speed of a CW-type radar.

Figure 2:
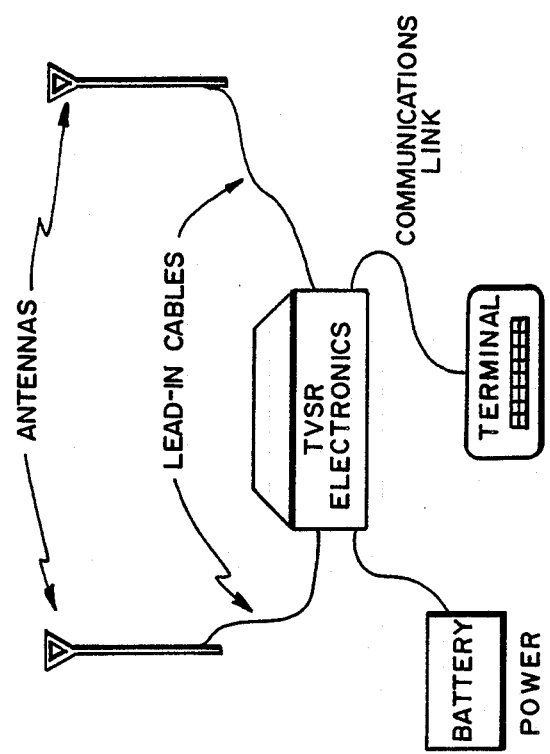
FIG. 2 shows the layout of the apparatus of the invention.

The system consists of a power source, two antennas, lead-in cable for the antennas, a terminal and an electronics unit, as shown in FIG. 2. The unit is powered using ac or dc power. A terminal allows the operator to set the detection zone range, the detection zone depth, the receiver gain, and other system selections, and to receive the results of the processed receive signal such as alarm information. The transmit signal generated in the electronics unit is transferred to the transmit antenna by coaxial lead-in cable. Similarly, the signal received at the receive antenna propagates down another lead-in cable to the receiver section of the electronics unit.

Referring again to FIG. 1, the electronics unit 1 generates the transmit signal and sends this signal via lead-in cable 2 to one of the antennas 4. The other antenna 5 is used to receive the reflected signal. The received signal is transferred to the receiver portion of the electronics unit by way of lead-in cable 3. The properties of the transmit waveform are such that a range-gated detection zone is established about the antennas. By using omni-directional antennas, omni-directional coverage is obtained. Directional antennas will reduce the azimuth and/or elevation coverage.

Figure 3:
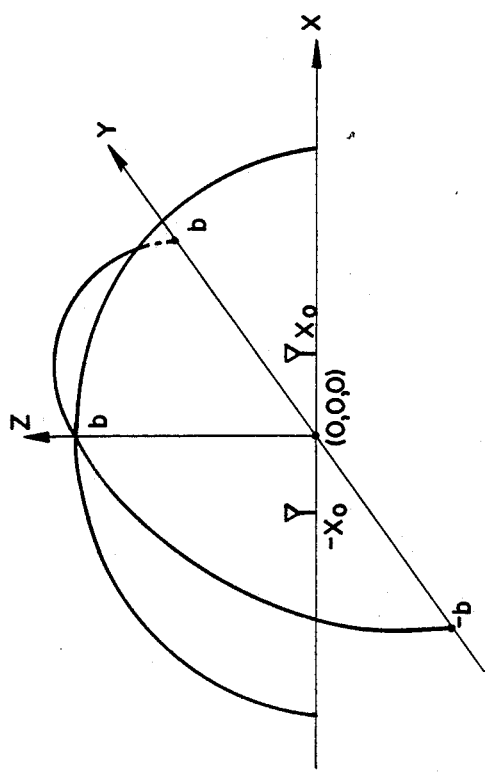
FIG. 3 is a diagram illustrating the configuration of the detection zone.

The detection zone is ellipsoidally-shaped with the antennas representing the foci of the ellipsoid. Omni-directional antennas are assumed. Referring now to FIG. 3, the operator makes two selections:

(i) antenna separation: the antennas are separated by a distance of $2 \times_0$, with a straight line between the antennas defining the x-axis.

(ii) nominal range: a nominal range of b is selected, specifying the range along the y and z-axes.

The detection zone range along the x-axis, a, is determined by the two selections:

$$a = (x_0^2 + b^2)^{\frac{1}{2}}$$

The detection zone exists for any (x,y,z) such that $$\frac{(x-x_0)^2}{a^2} + \frac{y^2 + z^2}{b^2} = 1$$

Typical detection zone values for the inventive system are: an antenna separation of 30 m, a nominal range of 80 m, a detection zone depth of 20 m. The approximate volume for these detection zone parameters is $1.6 \times 10^6$ cubic meters.

The operational and performance benefits of an intruder detection radar in the low VHF band and, in particular, near 60 MHz, are well understood. The radar cross-section (RCS) for humans is a maximum in the low VHF band. This occurs because the effective length of a human while standing on ground is approximately a quarter-wavelength. Small animals and birds, by contrast, have a minimal RCS at this frequency range because they are much smaller than the 5 m wavelength of a 60 MHz signal; these smaller targets are, in fact, referred to as Rayleigh scatterers. Similar results are also applicable for propagation through the forest; leaves, pine needles and branches are Rayleigh scatterers as well. As a result, the propagation loss through the forest and its clutter return are substantially less than that experienced by sensors operating at higher frequencies.

Figure 4:
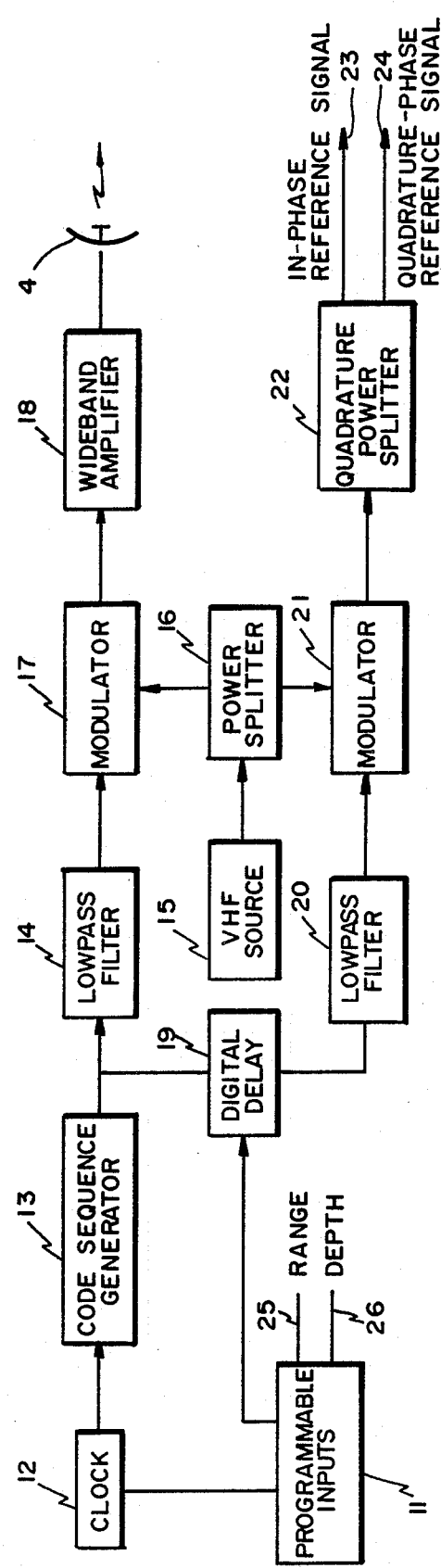
FIG. 4 is a schematic diagram of the transmitter portion of the system.

FIG. 4 illustrates the transmitter portion of an intrusion detection system of this invention. A continuous wave source 15 supplies a VHF signal to a modulator 17 through a power splitter 16. The VHF signal is preferably at 60 MHz. Modulator 17 is also supplied with a code sequence from code generator 13 which has been filtered by lowpass filter 14 to remove the higher frequency components of the code. This results in the output from modulator 17, which is supplied to transmitting antenna' 4 through a wideband amplifier 18, being a continuous wave with smooth phase changes at each change of the code from generator 13. The rate at which the code is generated is controlled by a clock 12 which, in turn, is controlled by a control unit 11. By changing the clock rate the code sequence rate is changed and, as will be shown below, the depth of the range window altered.

A digital delay unit 19 is coupled to the output of the code sequence generator 13 and supplies a delayed version of the code sequence to a lowpass filter 20 and subsequently to a modulator 21 substantially identical to modulator 17. This provides a reference signal for use in the receiver for demodulating any received signals from a target. So that both in-phase and quadrature-phase received signals may be detected, quadrature power splitter 22 supplies appropriate signals on lines 23 and 24 to the receiver unit. The amount of delay in the digital delay circuit 19 determines the nominal range at which the detection zone will be located and the clock rate determines the depth of the detection zone.

Figure 5:
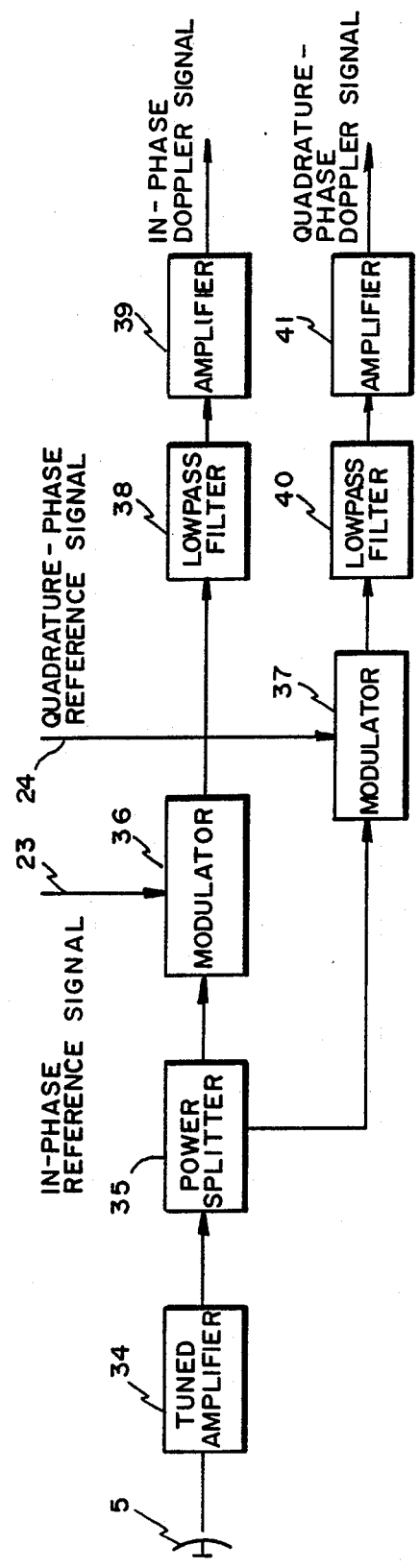
FIG. 5 is a schematic diagram of the receiver portion of the system.
Figure 6:
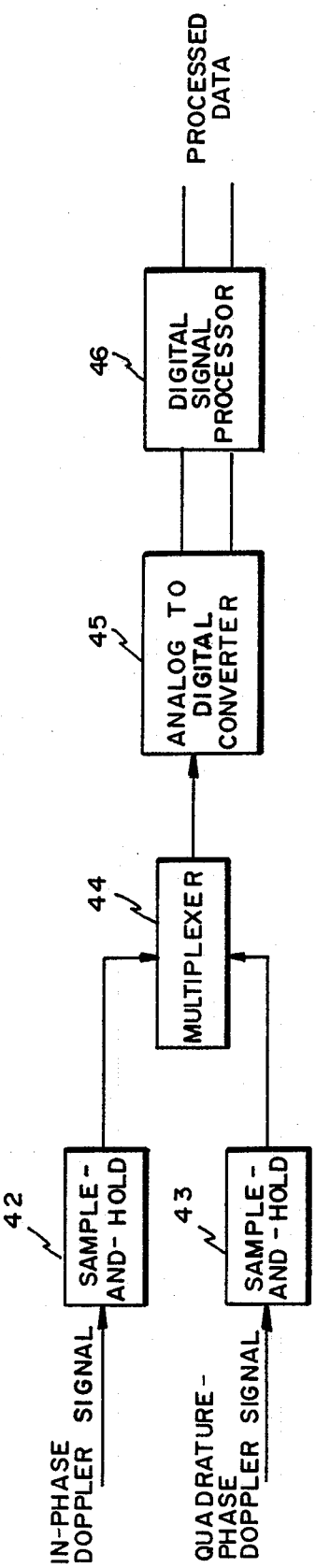
FIG. 6 is a schematic diagram of the signal processing portion of the system.

The presence of a target in the detection zone causes a reflection of some of the transmitted signal. The reflected signal, together with some signal received directly from the transmitting antenna, is picked up by receiving antenna 5 (see FIG. 5). The received signal is bandpass filtered and amplified in amplifier 34 and divided using power splitter 35 into two channels. These signals are applied to modulators 36 and 37, where they are modulated by the in-phase 23 and quadrature-phase 24 reference signals, respectively. Referring to the in-phase channel for example, the received signal is mixed with the delayed replica of the transmitted signal in modulator 36. Only those signal components which are correlated with the delayed code sequence are detected and, hence, an enhanced signal representing any reflection at the particular range defined by this delay is produced. These in-phase and quadrature-phase detected signals are then processed in the normal manner through the remaining signal processing channels shown in FIGS. 5 and 6.

A typical system operates at a transmitted power of 20 mW with a code length of between 100,000 and 1 million bits and at a clock rate of 10 MHz. The longer the code length is the smaller is the probability of any ambiguity in the returned signals. There is a limit to code length, however, because the spacing between the spectral components must be greater than the Doppler bandwidth to avoid other ambiguities in the received signal. Typically, for a maximum Doppler bandwidth of 10Hz the spectral components are spaced at least 20 Hz apart. As previously mentioned, a variety of code sequences such as pseudo-noise, Barker codes and complementary series can be used.

Specifically, the in-phase detected signal goes through a low pass filter 38, an amplifier 39, and a sample-and-hold circuit 42. Both signals are then multiplexed in multiplexer 44, converted to digital signals in converter 45, and processed by processor 46 for subsequent Doppler frequency response. Signals exceeding a given threshold produce an alarm warning signal.

Although a particular embodiment has been described, it will be clear that variations are possible while remaining within the scope of the inventive concept. As the size of the detection zone increases, it becomes more important to locate the target in range, azimuth and elevation. This additional direction finding requirement can take a variety of forms. A high gain receive antenna can be scanned over the desired detection zone, with the azimuth/elevation resolution being determined by the antenna beamwidth. Alternatively, target azimuth and/or elevation can be determined by using two or more receive antennas to compare the relative phase of the return signals.

As a related embodiment, either the transmit or receive element could be replaced by a leaky coaxial cable. For example, the cable could encircle the antenna at a fixed radius. The effect of the pulse compression signal is to achieve a plurality of detection zones along the cable. Consequently, the perimeter along the cable is effectively divided into a number of sectors, thereby providing an indication of the intrusion location.

Although the apparatus of the preferred embodiment described above changes phase by 180°; the equipment will function with different amounts of phase change, 45° or 90° for example. The effect of the different angle of phase change is to modify the spectrum of the transmitted signal slightly by reducing its higher frequency content. Further, it is not necessary that there be only switching between two phase angles. Instead, the transmitted waveform could be switched by three or more different phase shifters, provided only that a delayed replica of the transmitted signal is used in the receiver.

I claim:

1. An intrusion detection system comprising:

means transmitting an r.f. signal formed from a continuous wave modified by phase changes at selected instants;

means providing a code sequence to control the selected instants;

means receiving a portion of the transmitted signal which may have been modified by the presence of a target; and means mixing the received signal with a delayed replica of the transmitted signal to establish a detection zone external to the space between the antennas, the delay establishing the range of the detection zone;

whereby the system provides an enhanced response relating to objects in the detection zone.

2. A system as in claim 1 wherein a plurality of detection zones are provided at different ranges from the antennas.

3. An intrusion detection system comprising:

a transmitting and a receiving antenna, their combined beam patterns establishing a substantially continuous detection zone spaced in azimuth and elevation from the antennas;

a c.w. source;

a code sequence generator;

phase modulating means responsive to the code sequence generator and the output from the c.w. source to provide a signal to the transmitting antenna consisting of the c.w. signal with phase changes at instants determined by the code sequence;

demodulator means reversing the phase changes on that portion of the received signal that corresponds to a selected range to provide a monitoring signal;

whereby the monitoring signal exhibits an enhanced response to the reflections from targets at the selected range.

4. An intrusion detection system comprising:

a leaky coaxial cable extending along a perimeter to be protected and an associated antenna, transmission between them defining a detection zone along the cable;

a c.w. source;

a code sequence generator;

phase modulating means responsive to the code sequence generator and the output from the c.w. source to provide a transmission signal to one of the antenna and cable consisting of the c.w. signal with phase changes at instants determined by the code sequence;

means connected to the other of the antenna and cable to provide a received signal;

demodulator means reversing the phase changes on that portion of the received signal that corresponds to a selected range to provide a monitoring signal;

whereby the monitoring signal exhibits an enhanced response to the reflections from targets in the detection zone.

5. An intrusion detection system as in claim 4 wherein the demodulator means is supplied with a series of delayed replicas of the transmission signal whereby the enhanced response to each delayed replica represents a sector of the cable within the detection zone.

* * * * *